FIG. I

INVENTORS
NORMAN L. BETZ
NICKOLAS J. STEPANIUK

United States Patent Office 3,674,501
Patented July 4, 1972

3,674,501
PREPARATION OF SOYBEAN DERIVATIVES USEFUL AS EGG WHITE EXTENDERS AND WHIPPING AGENTS
Norman L. Betz, Creve Coeur, and Nickolas J. Stepaniuk, Florissant, Mo. (both of 3600 N. 2nd St., St. Louis, Mo. 63160)
Filed Jan. 29, 1970, Ser. No. 6,792
Int. Cl. A23j 1/14
U.S. Cl. 99—17    6 Claims

ABSTRACT OF THE DISCLOSURE

Substantially oil-free soybean grits are first extracted with an acid-water solution having a pH of 4–6 and containing a trace of proteolytic enzyme, the purpose of the latter being to remove or deactivate the enzyme inhibitor naturally present in soybeans. After separating the aqueous extract from the residual grits, preferably by continuous centrifugal separation, the former may be concentrated and purified by ultrafiltration and then spray-dried to recover a soya derivative that is a useful egg white extender. The extracted grits are subjected to enzymatic hydrolysis under conventional conditions, but the hydrolysis proceeds much more rapidly because of the previous enzyme treatment. The resulting aqueous hydrolysis solution is advantageously separated from the spent grits, then concentrated and purified as before. Improved soya-derived whipping agents are thereby obtained. Combining the acid-water and hydrolysis extracts yields an even broader range of novel soya-derivatives useful as egg white extenders and whipping agents.

BACKGROUND

The invention relates to the preparation of new and useful compositions derived from soybean derivatives and more particularly to the preparation of said derivatives which are useful as egg white extenders and whipping agents for confectionary and bakery products.

It is known to first leach substantially oil-free ground soybeans using an acid-water solution having a pH which may vary from 4 to 5. The purpose of this leach is to remove so-called "nitrogen free solubles," consisting essentially of carbohydrates, which were considered to have an adverse effect upon the whipping properties of the desired hydrolyzed soya protein and have therefore been discarded. The soybean residue is then subjected to enzymatic hydrolysis, e.g., with pepsin, at a pH of 1.9–2.5 to obtain a solution of hydrolyzed soya proteins. Complete hydrolysis requires from about 12 to as long as 24 hours. Concentration and drying, e.g., spray-drying of this solution yields a water-dispersible composition consisting primarily of hydrolyzed soya protein which is useful as a whipping agent in various food products such as candy, frappes, dry cake mixes and the like.

Using the above methods, however, it is difficult to obtain consistently satisfactory yields and quality. The pretreatment of the soybean starting material with an acid wash results in the loss of valuable material and is not always effective for removing impurities which adversely affect the odor, flavor and other properties of the final product.

It is therefore an object of the present invention to provide methods for treating soybeans which are more efficient and effective than the methods known heretofore and also to provide new compositions derived from soybeans which are more effective as egg white extenders and whipping agents than similar compositions known heretofore. Other objects and features will be in part apparent and in part pointed out hereinafter.

The invention accordingly comprises the products and methods hereinafter described, the scope of the invention being indicated in the following claims.

Figure 1:
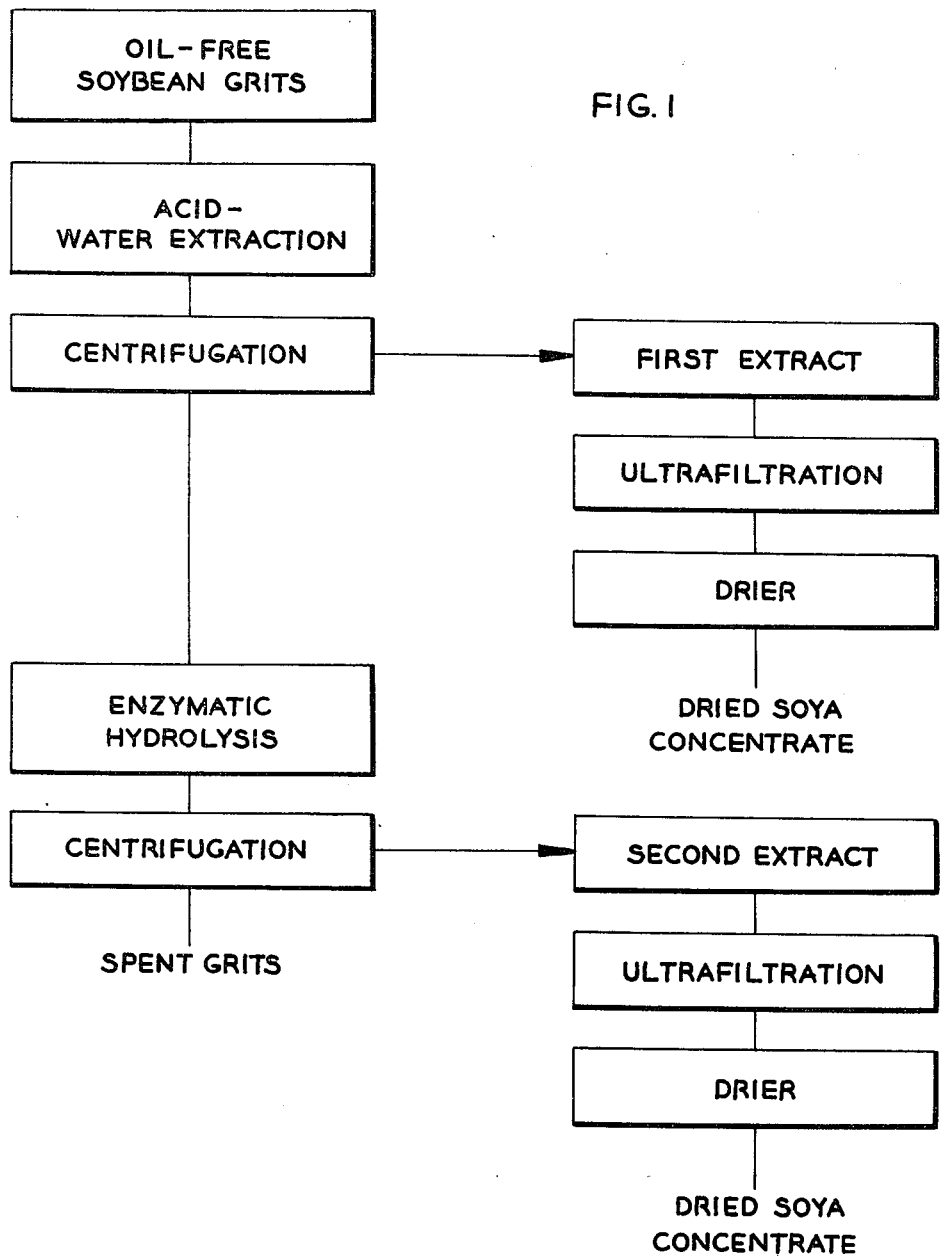
Figure 2:
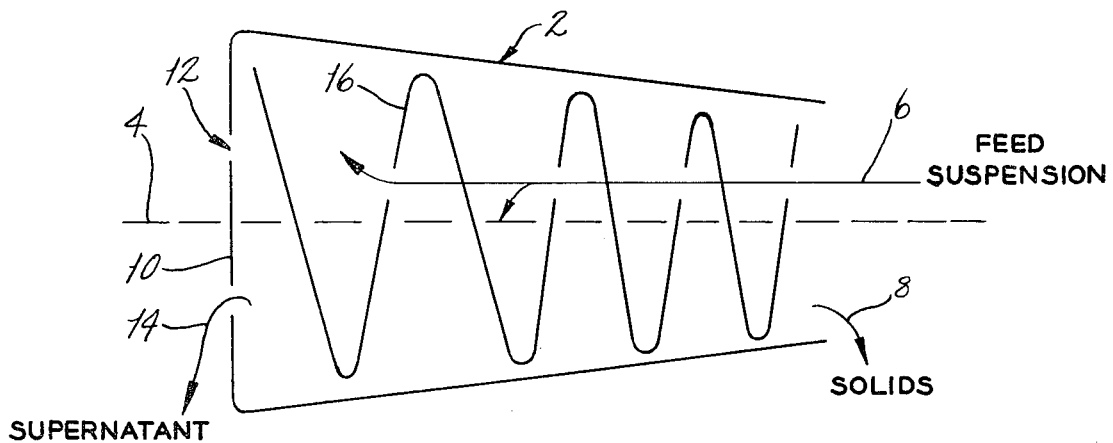
Figure 3:
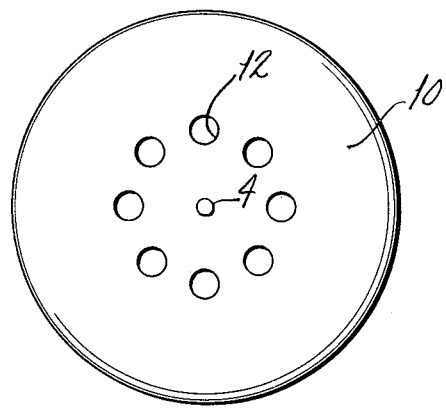

In the accompanying drawings, in which one of various possible embodiments of the invention is illustrated, FIG. 1 is a flow diagram of the process steps of the present invention;

FIG. 2 is a diagram of the centrifugal apparatus for the centrifugation step; and FIG. 3 is a left end view of the FIG. 2 apparatus.

Corresponding reference characters indicate corresponding parts throughout the several views of the drawings.

GENERAL STATEMENT OF THE INVENTION

According to the present invention ground soybeans from which substantially all the oil has previously been extracted are leached at a temperature of 12–25° C. with an acid-water solution having a pH of approximately 4–6 and containing a trace of a proteolytic enzyme such as pepsin for a time sufficient to extract the water-soluble and water-dispersible soybean constituents. The residual solids are then separated from the aqueous extract by decantation or the like. A preferred method is continuous centrifugal separation, i.e., with continuous discharge of the solids and the supernatant extract. The extract is then concentrated and dehydrated to obtain dried soybean derivatives comprising approximately 30–60% water-dispersible, unhydrolyzed soya protein, the balance consisting essentially of water-soluble soybean carbohydrates. In a preferred embodiment of the invention the aqueous extract is first partially dewatered by reverse osmosis and then spray-dried. In addition to removing water, reverse osmosis also removes objectionable impurities, whereby the color, odor, flavor and other properties of the product are substantially improved.

The resulting combination of soya carbohydrates and unhydrolyzed protein is useful per se as a replacement or extender for egg whites. It may also be combined with varying proportions of hydrolyzed soybean protein to yield a series of derivatives useful as whipping agents in a variety of food products such as candies, prepared cake mixes and the like.

The soybean residue from the said leaching treatment also represents an improved source of soybean protein for enzymatic hydrolysis, since the aforementioned leach serves to solubilize and at least partially remove an enzyme inhibitor naturally present in soybeans which is not affected by any of the pre-hydrolysis treatments employed heretofore.

DESCRIPTION OF THE PREFERRED EMBODIMENTS (1) Extraction of water-soluble components with an acid-water solution containing pepsin In one embodiment of the invention substantially oil-free ground soybeans, such as soybean grits, are slurried for 15 minutes at 25° C. in acid-water solution, e.g. hydrochloric acid, having a pH of 4.3 and containing 0.04% by weight of 1:6000 strength pepsin based on the weight of the grits (e.g., 18.0 g. pepsin per 100 lbs. of grits). A suitable proportion is 5 lbs. of the extraction solution per lb. of grits. The grits are then separated from the resulting aqueous extract, preferably by decantation or centrifugal separation. Contrary to the usual practice the extract is saved for further processing. The grits are slurried in water for 30 minutes at 25° C., separated, and then used as the protein-source material for subsequent enzymatic hydrolysis. In a continuous process this wash liquor may advantageously be used to prepare the aforementioned acid-water solution.

If the solution is isoelectric, i.e., has a pH within the range of about 4–5 as above, the solids extracted from the soybean starting material comprise approximately 30% unhydrolyzed soy protein, the balance consisting essentially of carbohydrates with a small proportion of other water-soluble soya constituents such as salts and the like. If, on the other hand, the pH of the extract is raised above the isoelectric range, e.g., to about 6, then the extracted solids may comprise a larger proportion of unhydrolyzed protein. Since for the purpose of the present invention hydrolysis of the soya protein is undesirable, the pH of the extraction mixture should not be below about 4, the isoelectric pH being in the range of 4–5. No significant hydrolysis occurs if the pH is within or is above the isoelectric range, i.e., within 4 to 7, the sole function of the pepsin being to remove or inactivate the enzyme inhibitor naturally present in soybeans. It is believed that the pepsin at least in part combines with and solubilizes this inhibitor, but in any event it has been found that the presence of some pepsin in the initial acid-water extraction greatly facilitates subsequent proteolytic hydrolysis of the insoluble protein remaining in the extracted grits.

(2) Separating the aqueous extract from the residual soybean solids

While the residual solids may be separated from the aqueous extract by simple decantation, a preferred method is continuous centrifugal separation, i.e., employing a centrifuge provided with means for continuously adding the extraction mixture and means for continuously discharging the separated solids and supernatant extract. The degree of separation is controlled by varying the rate at which the feed material is added to the separator. The slower the rate of addition, and therefore the longer the residence time of the aqueous extract in the centrifuge, the greater will be the proportion of solids separated from the aqueous extract.

A device suitable for carrying out this centrifugal separation is shown diagrammatically in FIGS. 2 (side view) and 3 (left end view). A hollow drum 2 revolves about a horizontal axis 4. The drum is in the form of a truncated cone. The narrow end is open to permit introduction of the feed slurry through a pipe 6 leading to the interior of the drum and to permit continuous discharge of the separated solids as indicated by the arrow 8. The wide end of the drum is closed by a plate 10 in which there are a series of holes 12. The supernatant liquor is centrifugally forced to the wide end of the drum and discharged through these holes as indicated by the large arrow 14. Inside the drum there is a helical scraper or auger 16 which revolves at a speed somewhat slower than that of the drum and thereby serves to push the separated solids toward the narrow end of the drum where they are discharged.

A suitable centrifuge of this kind having a drum 6 in. in diameter is available from the Bird Machine Co. of Evanston, Ill. Using this separator, useful feed rates were found to be within the range of 0.5–5 gallons per minute. Generally speaking, the shorter the time the extraction mixture remains in the centrifuge, i.e., the shorter the "residence time," the greater will be the solids content of the supernatant extract. For example, if the residence time in the separator is 4.8 seconds, the supernatant extract has been found to contain 4% more solids and 11% more protein than when the residence time was increased to 15 seconds. The reason is this: when the residence time is increased, some of the larger protein and carbohydrate molecules dispersed in the extract are spun out with the suspended solids thereby reducing the solids content of the supernatant extract. Thus by controlling the rate of addition and thereby the residence time of the extract in the separator, it is possible to exercise a much greater measure of control over the composition of the extract, especially with regard to the maximum size of the constituent molecules.

(3) Concentrating and purifying the supernatant extract

The aqueous extract from the preceding step can be concentrated by evaporation, but it is preferably concentrated by ultrafiltration. By employing a semi-permeable filter of suitable pore size, not only can the extract be partially dewatered, but soluble salts, simple sugars and other undesired compounds of low molecular weight, e.g., lower than about 400, can be removed at the same time. Significant purification and refinement of the extracted soya constituents can thereby be effected and the desired functional properties of the finished soya derivative can be more positively controlled. Moreover the flavor, odor and color of the finished products are substantially improved.

A preferred form of ultrafiltration for the purposes of the present invention is that commonly known as "reverse osmosis." The method comprises passing the liquor under pressure through a long pipe made from some strong and porous material such as fiberglass, the interior of the pipe being lined with a semi-permeable membrane the pores of which will permit the escape of water and other small molecules while retaining the larger protein and carbohydrate molecules present in the extract.

Apparatus suitable for carrying out the reverse osmosis treatment is commercially available. For example, one such device is manufactured by Havens International of San Diego, Calif. ("Osmotik" Model No. 072). For the purposes of the present invention, a suitable membrane is of the modified cellulose acetate type from 0.004 to 0.006 inch thick. Such membranes allow passage of simple sugars, amino acids, salt and water but not the larger sugar and protein molecules.

While one pass through this unit may be sufficient, the extract may advantageously be recycled through the unit one or more times. If the aqueous extraction is carried out at pH of 6, i.e., just above the isoelectric range, a greater proportion of the soya protein will be solubilized. The increased proportion of higher molecular weight protein resulting thereby significantly alters the osmotic characteristics of the resulting aqueous extract. If such an extract is subjected to reverse osmosis as before, it has been found that a greater proportion of the lower molecular weight carbohydrates are removed through the semi-permeable membrane along with the salts and other small molecules. As a result the resulting soya derivative contains a higher proportion of water-dispersible unhydrolyzed soya protein than if the pH of the acid-water extraction solution is within isoelectric limits.

Thus by combining continuous centrifugal separation with ultrafiltration, preferably reverse osmosis, both the maximum and minimum size of the molecules composing the final product can be more effectively and positively controlled than in the processes known and used heretofore.

The resulting concentrated extract may then be spray-dried to obtain a dried powdered soybean derivative containing approximately 30–60% water-dispersible soybean protein. The protein content of the derivative is a function of the pH of the extraction mixture, the residence time of the extract in the centrifuge, and the amount of low molecular weight soluble removed by the reverse osmosis treatment. The balance of the constituents consists essentially of carbohydrates, i.e., the "nitrogen-free solubles" which have heretofore been discarded as worthless.

(4) Enzymatic hydrolysis of the previously extracted soybean solids

The washed soybeans solids from Step 2 are subjected to enzyme hydrolysis with an acid solution (pH 2) containing a proteolytic enzyme such as pepsin. Suitable proportions are 80.0 grams of 1:6000 strength pepsin and 84 lbs. of water per 100 lbs. of wet cake. This is equivalent to approximately 1% pepsin based on the protein content of soybean solids. The grits are digested with the pepsin solution for 1.5 hours at a temperature of 100° F. (38° C.). The pH is then adjusted to 6.0 and the mixture is centrifuged to separate the spent grits from the aqueous hydrolysis liquor. The spent grits may be washed with water, and the wash liquor recycled and used to wash the grits separated from the preceding isoelectric leach liquor.

The hydrolysis liquor may be concentrated and refined by reverse osmosis in the same manner as the acid-water extract. This treatment removes from the liquor low molecular weight sugars formed by acid hydrolysis of the polysaccharides present in the soybean solids, which sugars appear to have an adverse effect on the functional properties of the finished product. For example, hydrolyzed soy protein which has been refined by reverse osmosis forms frappes which are more stable than those formed by unrefined but otherwise similar soya protein.

If desired this aqueous hydrolysis liquor can be combined with the aqueous extract obtained from the initial acid-water extraction either before or after the latter has been subjected to reverse osmosis. By combining the aqueous hydrolysis liquor with the acid-water extract a wide range of soybean derivatives may be obtained differing in their hydrolyzed protein content. Such products are useful whipping agents for a variety of food products such as candy, frappes, cake mixes, and the like. The presence of substantial amounts of polymeric soya carbohydrates, rather than being harmful as previously believed, appears instead to assist coaction between egg albumin and soya protein in such a manner that a combination of the two is able to function more economically and effectively than either one alone.

Many variations are subvariations of the process of the present invention are useful and valuable. For example, the soya starting material may be subjected to an acid-water leach with a solution containing a trace of proteolytic enzyme, and the resulting aqueous extract may then be centrifugally separated, subjected to reverse osmosis and dried to obtain a solid soya concentrate consisting essentially of water-dispersible, unhydrolyzed soya proteins and carbohydrates which are particularly effective and useful as egg white extenders.

Likewise, the soya solids separated from the aforementioned acid-water extract may be subjected to enzymatic hydrolysis, and the resulting aqueous extract similarly separated and concentrated in order to obtain a solid soya concentrate consisting essentially of water-dispersible, hydrolyzed and/or partially hydrolyzed soya proteins and carbohydrates. Such products, alone or in combination with the other known agents, are particularly effective as whipping agents.

The range of useful products can be further extended by combining the unhydrolyzed and hydrolyzed soya fractions in varying proportions either before or after the aqueous extracts have been concentrated and refined by reverse osmosis or other suitable form of ultrafiltration.

The following examples illustrate the invention.

EXAMPLE 1

An angle food cake was prepared according to the following recipe:

|   |   | G. |
|---|---|---|
| (A) | Dried egg white | 83 |
|   | Sugar | 150 |
|   | Cream of tartar | 9 |
|   | Salt | 7 |
|   | Water | 580 |
| (B) | Cake flour | 230 |
|   | Sugar | 490 |

The dry components of mixture A were sifted and then mixed with the water for one minute at low speed. The wetted mixture was then whipped for 4.5 minutes at high speed. Mixture B was sifted and blended in for 30 seconds. The batter (666 g.) was then folded with a spatula, divided into two 10-inch baking pans and baked for 30 minutes at 375° C. Cakes made according to this standard recipe were used as controls for evaluating cakes prepared according to the following examples.

EXAMPLE 2

Twenty-one grams (25%) of the dried egg whites in the preceding example were replaced by 4.2 grams of a dried soya-derivative extract representing all of the acid extractable soya components and the hydrolyzed soya proteins combined, prepared and refined according to the preferred conditions disclosed herein. Thus one part by weight of the dried soya derivative replaced 5 parts by weight of dried egg whites. The resulting cake compared favourably in all respects (i.e., volume, texture, flavor and color) with cakes prepared according to the standard recipe of Example 1.

EXAMPLE 3

Twenty-one grams of the spray-dried derivative representing the unhydrolyzed water-soluble soya constituents recovered from the acid-water leach employing continuous centrifugal separation and reverse osmosis replaced 21 grams of the dried egg whites in the recipe of Example 1. Such a soya derivative has approximately the composition:

| Protein, percent | 33.3 |
|---|---|
| Ash, percent | 8.7 |
| Moisture, percent | 5.0 |
| Carbohydrates, percent | 53.0 |
| ph of a 3% solution | 6.6 |

The resulting angle food cake compared favorably in all respects with cakes made from the standard recipe of Example 1.

EXAMPLE 4

The stability of a cold frappe made with the improved soya whipping agent of the present invention was compared with the stability of frappes prepared with pure egg albumin, known as "Spray Candy Albumin" and two commercially available hydrolyzed soya protein whipping agents identified in the following table as "A" and "B."

The improved soya whipping agent comprised the spray dried concentrate from the enzymatic hydrolysis extract which had been refined by continuous centrifugal separation and reverse osmosis as previously described. The hydrolyzed extract itself was obtained from soya grits that had previously been subjected to the acid-water leach also previously described. The composition of such an agent is typically as follows:

| Protein, percent | 62.5 |
|---|---|
| Ash, percent | 4.5 |
| Moisture, percent | 5.1 |
| Carbohydrates, percent | 27.9 |
| pH of a 3% solution | 6.6 |

The frappes were prepared as follows: First, 50 g. of an aqueous dispersion containing 6.9 g. of the whipping agent was beaten in an electric mixer at high speed for 5 minutes using a wire whip. Then, 75 g. of sugar were added over a period of 30 seconds at low speed, after which the mixture was again beaten at high speed for 15 seconds. Finally, 75 g. of corn syrup were added at low speed and the mixture again beaten at high speed for 30 seconds.

Stability was measured by placing the frappe in a 10 cm. funnel suspended over a graduated cylinder. The amount of material collected in the cylinder was noted after 24 hours and 48 hours.

| Whipping agent | Cold flow (ml.) | |
|---|---|---|
| | 24 hours | 48 hours |
| Pure egg albumin | 22 | 70 |
| Commercial Agent "A" | ¹4 | ¹48 |
| Commercial Agent "B" | ¹13 | ¹43 |
| Improved agent | 0 | 5 |

¹ Separation of the corn syrup from the sugared whipping agent also occurred.

EXAMPLE 5

A potable frappe for nougats employing the improved soya-whipping agents of the present invention was prepared as follows: To a dispersion of 40 g. of whipping agent in 80 g. of water in a mixer equipped with a wire whip were added 120 g. of powdered sugar over a period of 2 minutes at low speed and the mixture was then whipped for 5 minutes at high speed. To this aerated mixture was then added over a period of 2 minutes at low speed a "cooked bob" consisting of 300 g. of granulated sugar, 1050 g. of corn syrup and 125 g. of water, which has been carefully cooked to 265° F. The hot mix was stirred for an additional 30 seconds and then slabbed. The resulting frappe was stable and compared favorably with frappes made from pure egg albumin and the two commercially available hydrolyzed soya protein whipping agents of Example 4.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. The process of making a soybean derivative which comprises treating substantially oil-free ground soybeans with an acid-water solution having a pH of about 4–6 and containing an amount of pepsin sufficient to inactivate the enzyme inhibitors naturally present in soybeans, continuing the treatment for a time sufficient to extract a substantial proportion of the soluble carbohydrates and water-dispersible proteins present in the soybeans, removing suspended solids from the supernatant extraction mixture, and recovering from the said extract a dried soybean derivative comprising about 30–60% water-dispersible, substantially unhydrolyzed soya protein.

2. A process according to claim 1 wherein the soybean derivative is isolated from the extraction mixture by concentrating and spray-drying the mixture.

3. A process according to claim 1 wherein the said acid-water solution contains approximately 0.04% of 1:6000 strength pepsin based on the weight of the ground soybeans.

4. A process according to claim 1 wherein the suspended solids and a portion of the larger dispersed protein molecules are removed from the extraction mixture by continuous centrifugal separation.

5. A process according to claim 1 wherein the supernatant extract is subjected to reverse osmosis through a membrane permeable to compounds whose molecular weight does not exceed approximately 400, and continuing the reverse osmosis until approximately two-thirds of the water present in the extract is removed.

6. A process according to claim 1 wherein the suspended solids are separated and subsequently treated at a temperature of 35–40° C., with a pepsin solution having a pH of 2.0 and containing the equivalent of 0.20% of 1:6000 strength pepsin based on the original weight of the solids for a time sufficient to hydrolyze and disperse the proteins in said solids, removing the solid residue from the hydrolysis mixture and combining at least a substantial proportion of the supernatant extract from the second treatment with that from the first treatment, and concentrating and drying the combined liquors to recover a soya derivative comprising a mixture of hydrolyzed and unhydrolyzed soya proteins.

References Cited

UNITED STATES PATENTS

| 2,051,017 | 8/1936 | Schwarz et al. | 99—17 X |
| 2,489,173 | 11/1949 | Burnett et al. | 99—14 |
| 2,683,091 | 7/1954 | Singer et al. | 99—17 |

OTHER REFERENCES

Tauber, Henry, The Chemistry and Technology of Enzymes, John Wiley & Sons, 1949, p. 160.

A. LOUIS MONACELL, Primary Examiner

W. A. SIMONS, Assistant Examiner

U.S. Cl. X.R.

99—114

UNITED STATES PATENT OFFICE
CERTIFICATE OF CORRECTION

Patent No. 3,674,501　　　　　　　　　　Dated July 4, 1972

Inventor(s) Norman L. Betz and Nickolas J. Stepaniuk

It is certified that error appears in the above-identified patent and that said Letters Patent are hereby corrected as shown below:

Column 1, lines 5-7, "Norman L. Betz, Creve Coeur, and Nickolas J. Stepaniuk, Florissant, Mo. (both of 3600 N. 2nd St., St. Louis, Mo. 63160)" should read -- Norman L. Betz, Creve Coeur, Mo., and Nickolas J. Stepaniuk, Florissant, Mo., assignors to Mallinckrodt Chemical Works, St. Louis, Mo., a corporation of Missouri --.

Signed and sealed this 2nd day of January 1973.

(SEAL)
Attest:

EDWARD M. FLETCHER, JR.　　　　　　ROBERT GOTTSCHALK
Attesting Officer　　　　　　　　　　Commissioner of Patents